United States Patent
Plunkett et al.

[15] 3,662,777
[45] May 16, 1972

[54] TOOL CART

[72] Inventors: Larry D. Plunkett, Crystal Lake; Robert J. Massion, Des Plaines, both of Ill.

[73] Assignee: Signode Corporation

[22] Filed: July 28, 1970

[21] Appl. No.: 58,904

[52] U.S. Cl. .................................................... 137/355.17
[51] Int. Cl. .......................................................... B65h 75/36
[58] Field of Search .............. 137/355.17, 355.18, 355.27, 137/355.28, 355.22, 580

[56] References Cited

UNITED STATES PATENTS

| | | |
|---|---|---|
| 2,490,736 | 12/1949 | McGarry ................... 137/355.22 X |
| 3,381,704 | 5/1968 | Richardson ..................... 137/355.17 |
| 3,171,430 | 3/1965 | Lovell et al. .................. 137/355.28 X |
| 1,043,647 | 11/1912 | Wagner .......................... 137/355.18 X |
| 1,761,191 | 6/1930 | Browning ...................... 137/355.22 X |
| 2,514,862 | 7/1950 | Hannay .......................... 137/355.22 X |
| 2,583,181 | 1/1952 | Kunz .............................. 137/355.26 X |
| 2,735,717 | 2/1956 | Harman ......................... 137/355.17 X |
| 2,893,422 | 7/1959 | Schiltz ............................ 137/355.17 |

*Primary Examiner*—Samuel Scott
*Attorney*—Dressler, Goldsmith, Clement and Gordon

[57] ABSTRACT

A cart for transporting fluid actuated devices and having an axle rotatably supporting wheels on opposite ends thereof with the axle defining a fluid flow passage for supplying actuating fluid to the respective devices.

4 Claims, 3 Drawing Figures

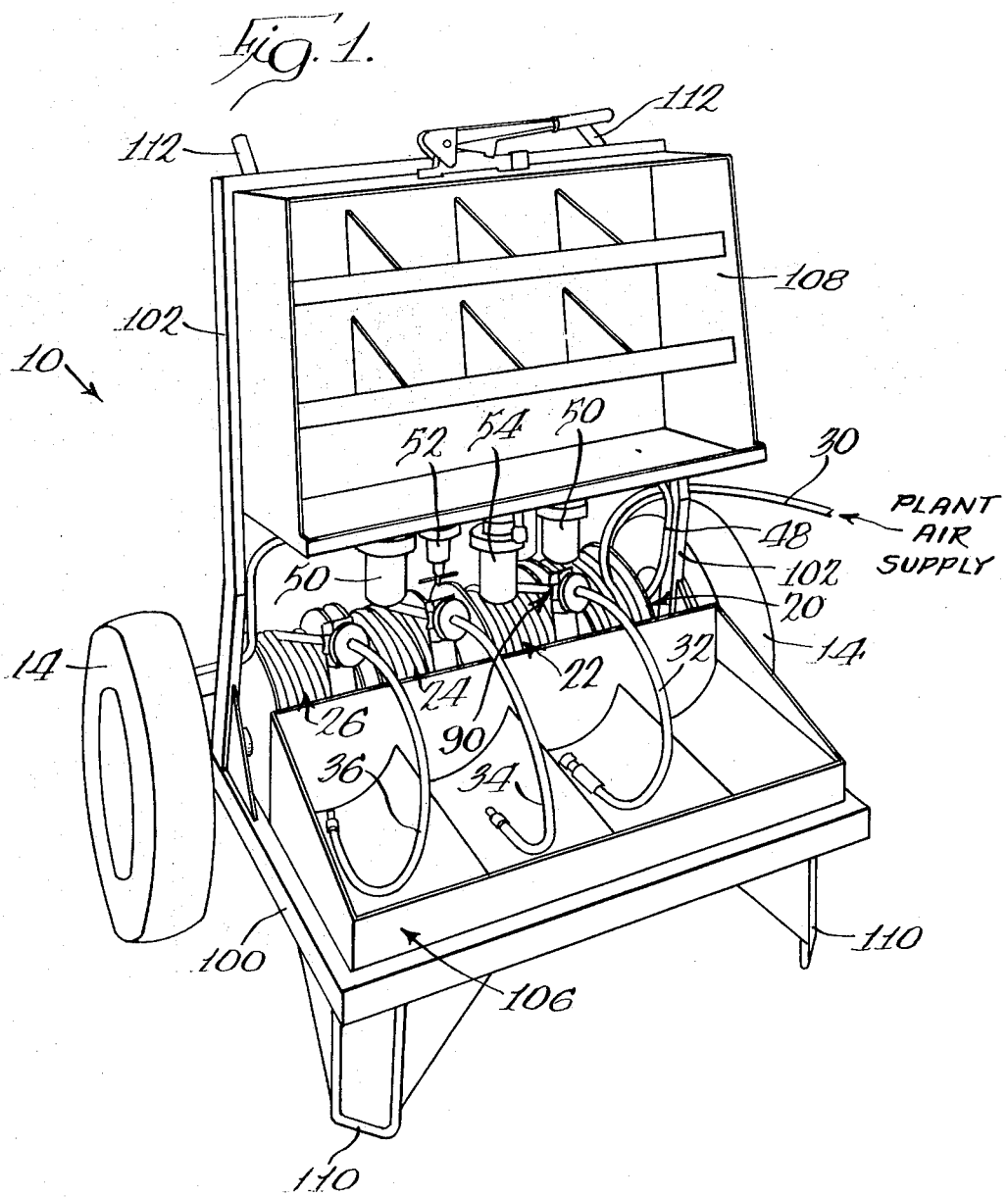

Patented May 16, 1972
3,662,777
2 Sheets-Sheet 2
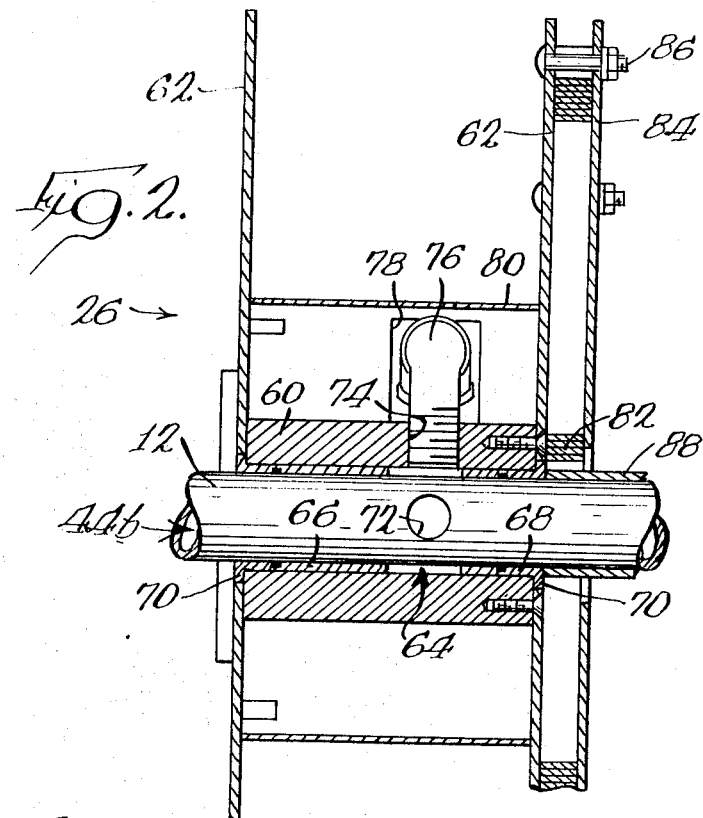
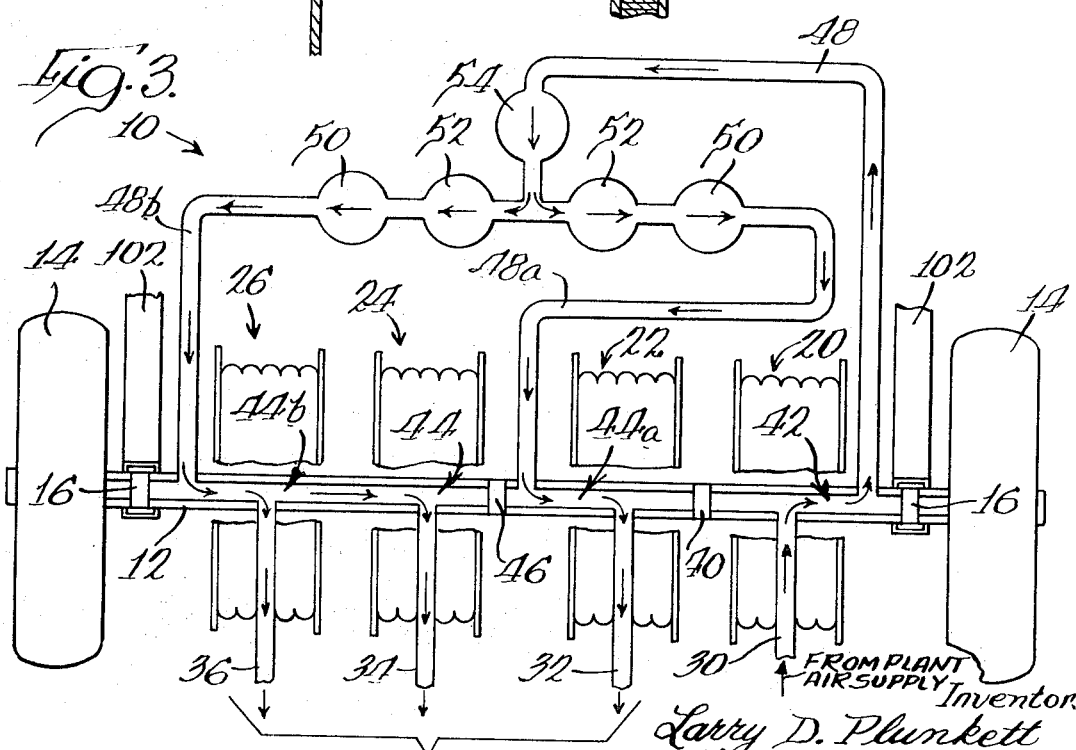
Inventors:
Larry D. Plunkett
Robert J. Massion
By Dressler, Goldsmith,
Clement & Gordon
Attys

TOOL CART

BACKGROUND OF THE INVENTION

The present invention relates generally to tool carts and more particularly to an improved portable, transport and supply cart or unit for portable fluid actuated devices.

In many production plants, fluid devices are utilized extensively for performing many operations. Many of these devices are of the portable type and are connected to a source of pressurized fluid through flexible conduits or hoses. Examples of these devices are pneumatic strap tensioning tools, nailers, staplers, etc., operated by air under pressure. One tool of this general type is covered in U.S. Pat. No. 3,249,131, disclosing a strap tensioning tool.

In production plants, the pneumatic fluid is generally directed from a source through fixed conduits having outlets at specific locations. Thus, when a portable pneumatic unit is utilized, it becomes necessary to connect the unit to the source of pressurized fluid through a flexible hose. In order to allow sufficient flexibility of movement for the operator, the flexible hosing in many instances is of considerable length. Furthermore, many operations require the simultaneous use of several pneumatic tools in a work area thereby necessitating a separate flexible hose for each tool.

With a plurality of relatively long flexible hoses in a single area, there is a good likelihood that the various hoses or conduits become tangled and will require the operators to direct their attention to straightening the hoses or conduits before further work may be done. This is not only annoying to the operator but is also very time consuming. In addition, the flexible hoses are scattered throughout the work area thereby restricting the maneuverability of the operator.

Thus, there is a need for some mechanism which eliminates the above problems and which has a neat general overall appearance.

SUMMARY OF THE INVENTION

The present invention contemplates a compact portable tool cart which is capable of supporting and storing tools as well as supplying pressurized fluid to the respective tools from a single source, during operation of the respective devices. The unit consists of a plurality of hose retrievers mounted on a single shaft which also defines the major portion of the chassis for the tool. Each of the hose retrievers or reels has a flexible hose or conduit supported thereon and one of the hoses is adapted for connection to a source of fluid under pressure and the remaining hoses adapted for connection to the devices. The inner end of the respective hoses are in constant communication with an opening extending through the shaft which defines at least part of a flow passage between the inlet hose and the remaining outlet hoses.

The flow passage in the shaft is divided into a plurality of segments with one segment being in communication with the fluid inlet hose while the remaining segments are in communication with the respective outlet hoses. The segment of the flow passage which is connected to the inlet hose in turn is connected to each of the remaining segments through conduit means having regulator means incorporated therein.

The unit or cart further includes a body supported on the shaft which defines storage means for a plurality of fluid operated devices and their ancillary equipment.

With a unit or cart of this type, the cart may be drawn to any location and the inlet hose connected to a source of pressurized fluid, such as air, so that a plurality of units may simultaneously be operated from a single source. Furthermore, the various components of the unit are located in such a manner that the center of gravity of the unit is located in close proximity to the axis of the shaft so that the entire unit may be readily wheeled about in congested areas by one man.

During transportation of the cart and when not in use all of the hoses can be neatly stored on the hose retrievers or reels and may be unreeled to any desired length with the remaining portion of the hoses being retained on the hose retriever.

BRIEF DESCRIPTION OF THE SEVERAL VIEWS OF DRAWINGS

FIG. 1 shows a perspective view of a tool cart constructed in accordance with the present invention;

FIG. 2 shows an enlarged vertical sectional view of one hose retriever and its relationship to the remainder of the unit; and FIG. 3 is a schematic illustration of the fluid circuit incorporated into the tool cart of FIG. 1.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Referring to FIGS. 1 and 3, the tool cart of the present invention is generally designated by the reference numeral 10 and consists of a two-wheeled vehicle designed to contain tool and supply storage areas as well as and be capable of supplying actuating fluid from a single source to a plurality of fluid operated devices which can be used simultaneously at different locations.

The transport and supply unit or cart 10 includes an axle 12, which is in the form of a hollow shaft or tubular member. The axle or shaft 12 has a pair of wheels or ground engaging members 14 rotatably supported on opposite ends thereof and the interior opening defined by the shaft is closed adjacent opposite ends by plugs 16. A plurality of reels or hose retrievers 20, 22, 24 and 26 are rotatably supported at axially spaced locations on the shaft 12. Each of the hose retrievers or reels has flexible conduit near or hoses 30, 32, 34, 36 wound thereon.

According to the present invention, the axle or hollow shaft defines a fluid flow passage between a pressurized fluid source and a plurality of fluid actuated devices. For this purpose, a plug 40 (FIG. 3) is located in the tubular member 12 between the plugs 16 to divide the opening or flow passage in the tubular member or shaft 12 into first and second portions 42 and 44. The first portion 42 of the opening or flow passage is in constant communication with the inner end of hose 30, in a manner which will be described later, while the opposite or outer end of the hose 30 is adapted to receive a source (not shown) of actuating fluid, such as air, under pressure.

In order to supply the pressurized air to several units simultaneously and to be capable of individually regulating the supply of fluid to at least some of the devices, the second portion of the flow passage is divided into at least two segments 44a and 44b by a further plug 46. In addition, the first portion or segment 42 of the flow passage in the shaft 12 is interconnected with each of the remaining segments 44a, 44b, through a conduit 48 having first and second branches 48a and 48b respectively connected to the segments 44a and 44b of the second portion of the flow passage. In order to be capable of individually regulating the flow or pressure of fluid to the respective segments 44a and 44b, which may be termed the outlet segments, each of the branches 48a and 48b has a pressure regulator 52 and a lubricator 50 incorporated therein. In addition, the conduit 48 may incorporate a suitable filter 54 to remove any contaminants from the fluid prior to being directed to the respective fluid actuated devices.

As was indicated above, each of the hoses or flexible conduits 30 through 36, is in constant communication with a segment of the opening defined by the shaft 12 in a manner to allow unlimited relative movement between the end of the hose and the shaft 12. The mechanism for producing continuous communication between each of the segments and the respective hoses is more clearly shown in FIG. 2, where a hose retriever or reel is shown in enlarged sectional view. Since all reels are identical in construction and are connected to the associated segments in a like manner, only reel 26 will be described.

The reel or conduit retriever 26 includes a sleeve 60 surrounding the shaft or axle 12 with a pair of circular plates or discs 62 secured to opposite ends of the sleeve. The sleeve cooperates with the shaft in a manner to place the hose or conduit 36 in constant communication with the opening in the shaft 12. For this purpose, means are interposed between the sleeve and the axle to define an annular chamber surrounding the axle. In the illustrated embodiment, the annular chamber 64 is produced by inserting a pair of short sections of tubing 66 and 68 into opposite ends of the opening in the sleeve 60. Preferably, the tubes 66 and 68 each have a radial flange 70 adapted to engage the opposite end surfaces of the sleeve. The inner end of the tubes terminate at a location spaced from each other to define the annular chamber 64 between the outer surface of the shaft 12 and the wall of the opening in the sleeve 60.

The annular chamber 64 is placed in constant communication with the opening in the shaft 12 through one or more apertures 72 produced in the shaft 12. The annular chamber 64 is also placed in constant communication with the inner end of the hose 36 supported on the reel 26 through a threaded opening 74 having an elbow 76 threadedly received therein. The free leg of the elbow extends through a slot 78 defined in the hub 80 interposed between the plates or discs 62 and the inner end of the hose (not shown in FIG. 2) is connected to the elbow 76. In order to insure that the hose may not be pulled from the end of the elbow, it is desirable to fix the hose to the elbow 76. For example, an ordinary hose clamp may be utilized for connecting the hose to the end of the elbow 76. Thus, it will be seen that the segment 44b of the flow passage defined by the hollow axle 12 is in constant communication with the hose 36 and the reel or hose retriever 26 can be rotated in either direction to reel and unreel the hose 36.

According to a further aspect of the present invention, the hose retriever 26 is biased to a first position wherein the hose 36 is in a retracted storage position. For this purpose, a spring 82 is interposed between the shaft 12 and is tensioned sufficiently to automatically retract the hose when the reel is conditioned for free rotation on the shaft. The spring 82 is of the spiral coiled type and is housed between one of the discs 62 and a cover plate 84 interconnected by a plurality of screws 86. One end of the spring 82 is connected to one of the screws 86 while the opposite end thereof is secured to a tube or sleeve 88 secured to the shaft 12, as by being keyed thereto. The connection between the coiled spring 82 and the tube 88 may be in the form of a hook and eye arrangement (not shown). The tube or sleeve 88 performs an additional function of a spacer between adjacent pairs of hose retrievers or reels. Thus, as shown in FIG. 2, one end of the sleeve 88 is in engagement with the tube 68 of reel 26, while the opposite end would be in engagement with tube 68 forming part of the hose reel 24 (not shown). Preferably, a commercially available quick release latching mechanism (not shown) is interposed between the shaft and each reel to hold the reel in any adjusted position. In addition, suitable guide means 90 may be provided for each hose.

The cart or transport unit preferably additionally includes storage means for carrying the portable devices as well as additional ancillary equipment or supplies necessary for performing any type of desired operation. Thus, the cart 10 (FIG. 1) further includes first and second substantially U-shaped frames 100 and 102 which are interconnected at one end and are suitably supported on the shaft 12 (FIG. 3). Each of the U-shaped frames 100 and 102 has a suitable storage area 106 and 108 defined thereon. Thus, the frames 100 and 102 and the storage areas 106 and 108 may be termed a body defining storage for portable pneumatic tools and various types of equipment.

In order to make the cart a self-supporting easily transportable unit, the frame 100 has a pair of legs 110 secured thereto while the frame 102 has a pair of handles 112 secured thereto so that a man may grasp the handles 112 and pivot the entire body about the axle for transporting the unit between locations.

As was indicated above, it is necessary to locate the center of gravity of the mass supported on the axle 12 relatively close to the center of the axle so that one man may readily wheel the unit between locations. Viewing FIG. 1 will reveal that all of the hosing and the hose retrievers are centered relative to the axle thereby leaving only the body which must be manipulated by the operator during movement of the unit between locations. By locating the two frames 100 and 102 at a location perpendicular to each other, the center of gravity of the body as well as the tools or supplies in the storage areas can readily be located substantially in alignment with the axis of the shaft by appropriate pivotal movement of the body about the axle.

By way of specific example, the tool cart disclosed herein may be equipped to be used as a portable strapping station including two strap tensioners, one sealer and one nailer, as well as miscellaneous supplies, such as nails, seals, anchor plates, etc. The two tensioners would be connected to the hoses 34 and 36 and thus would be supplied with pressured fluid through the branch 48b of conduit 48 and the flow of the fluid would be regulated by the regulator 52. The remaining outlet hose 32 could then have the sealer and nailer alternately attached thereto when it became necessary to perform such an operation.

With the present operation, three fluid or pneumatic actuated units can simultaneously be operated from a single source of actuating fluid. It should be noted at this point that the particular arrangement of the flow passage and the division into segments is intended solely for purposes of illustration and not of limitation. It will be appreciated that the second portion 44 of the flow passage defined in the shaft 12 may be divided into any desired number of segments and the conduit 48 would then have an equal number of parallel branches so as to supply air to a plurality of units from a single unit. Also, if it were not necessary for regulating the flow of fluid to the respective devices, the division of the opening in the shaft 12 would be eliminated and the opening would then define a direct flow passage between the inlet and outlet hoses.

What is claimed is:

1. A cart for transporting a plurality of fluid actuated devices comprising: an axle having ground engaging members on opposite ends thereof, said axle being a hollow tubular member which defines a fluid flow passage and said hollow tubular member including a plurality of axially spaced openings; a plurality of hose retrievers; means rotatably mounting each hose retriever on said axle in alignment with an opening in said tubular member, each mounting means comprising first and second tubes on said hollow tubular member, said tubes being axially spaced from one another to define an annular chamber in alignment with an opening in said hollow tubular member, and a sleeve positioned over said tubes, said sleeve having a passage therein establishing communication with the annular chamber between the tubes over which the sleeve is positioned; and a plurality of hoses, one end of each hose communicating with a passage in one of said sleeves and the other end of all but one of said hoses being adapted to be connected to a fluid actuated device, the other end of said one hose being adapted to be connected to a source of fluid under pressure.

2. A cart as defined in claim 1, including the further improvement of storage means supported on said axle for carrying devices and ancillary equipment.

3. A cart as defined in claim 1, in which each hose retriever is biased to a first position in which the hose associated therewith is in a retracted storage position.

4. A cart as defined in claim 1 in which a plurality of flow blocking members are provided in said tubular member, one flow blocking member being positioned outwardly of the hose retrievers at each end of said tubular member, and a further flow blocking member being positioned inwardly of the hose retriever with which said one hose is associated to provide a fluid inlet chamber at one end of said tubular member; and wherein conduit means establishes communication between said inlet chamber and at least one further section of said tubular member beyond said further flow blocking member.

* * * * *